No. 687,069. Patented Nov. 19, 1901.
H. A. ROTERMUND.
SEAL LOCK.
(Application filed May 1, 1901.)

(No Model.) 3 Sheets—Sheet 1.

WITNESSES: INVENTOR
Henry A. Rotermund
BY
ATTORNEYS

THE NORRIS PETERS CO., PHOTO-LITHO., WASHINGTON, D. C.

No. 687,069. Patented Nov. 19, 1901.
H. A. ROTERMUND.
SEAL LOCK.
(Application filed May 1, 1901.)
(No Model.) 3 Sheets—Sheet 2.
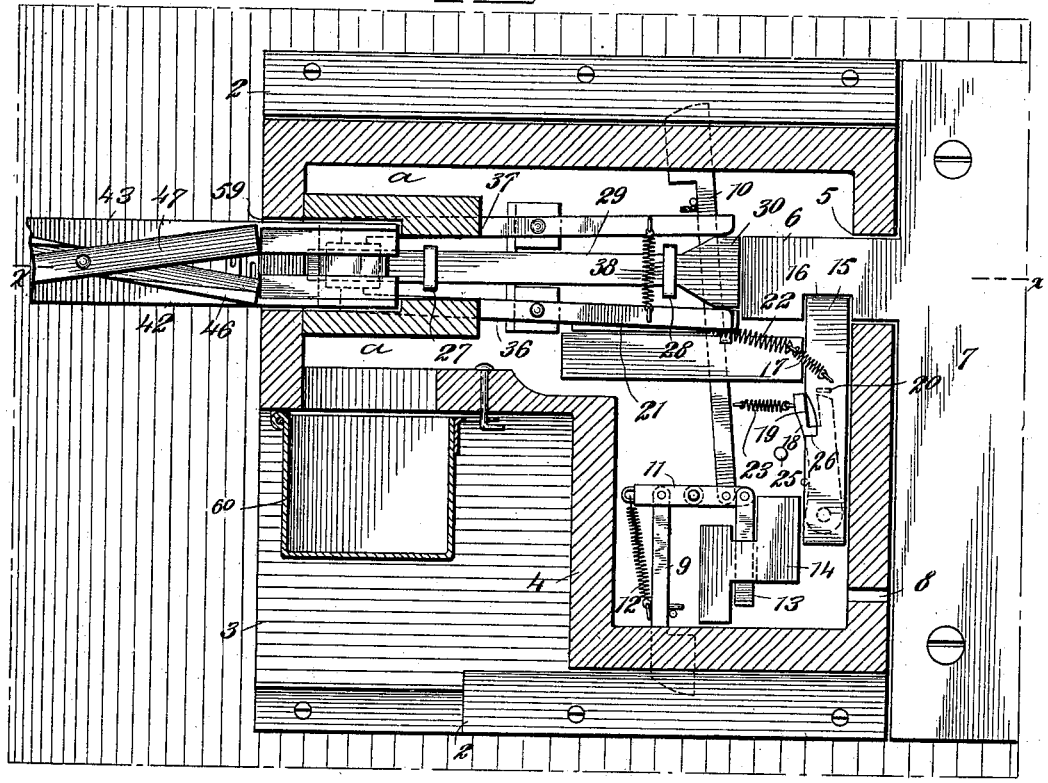
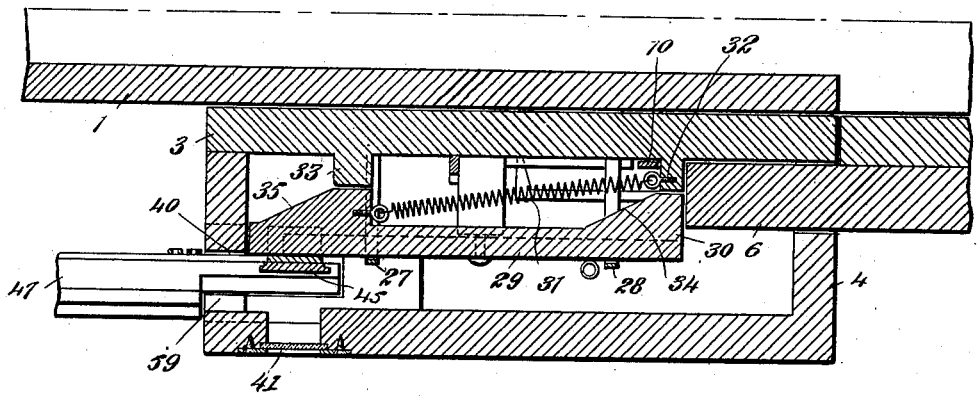
WITNESSES:
INVENTOR
Henry A. Rotermund
BY
ATTORNEYS No. 687,069. Patented Nov. 19, 1901.
H. A. ROTERMUND.
SEAL LOCK.
(Application filed May 1, 1901.)
(No Model.) 3 Sheets—Sheet 3.
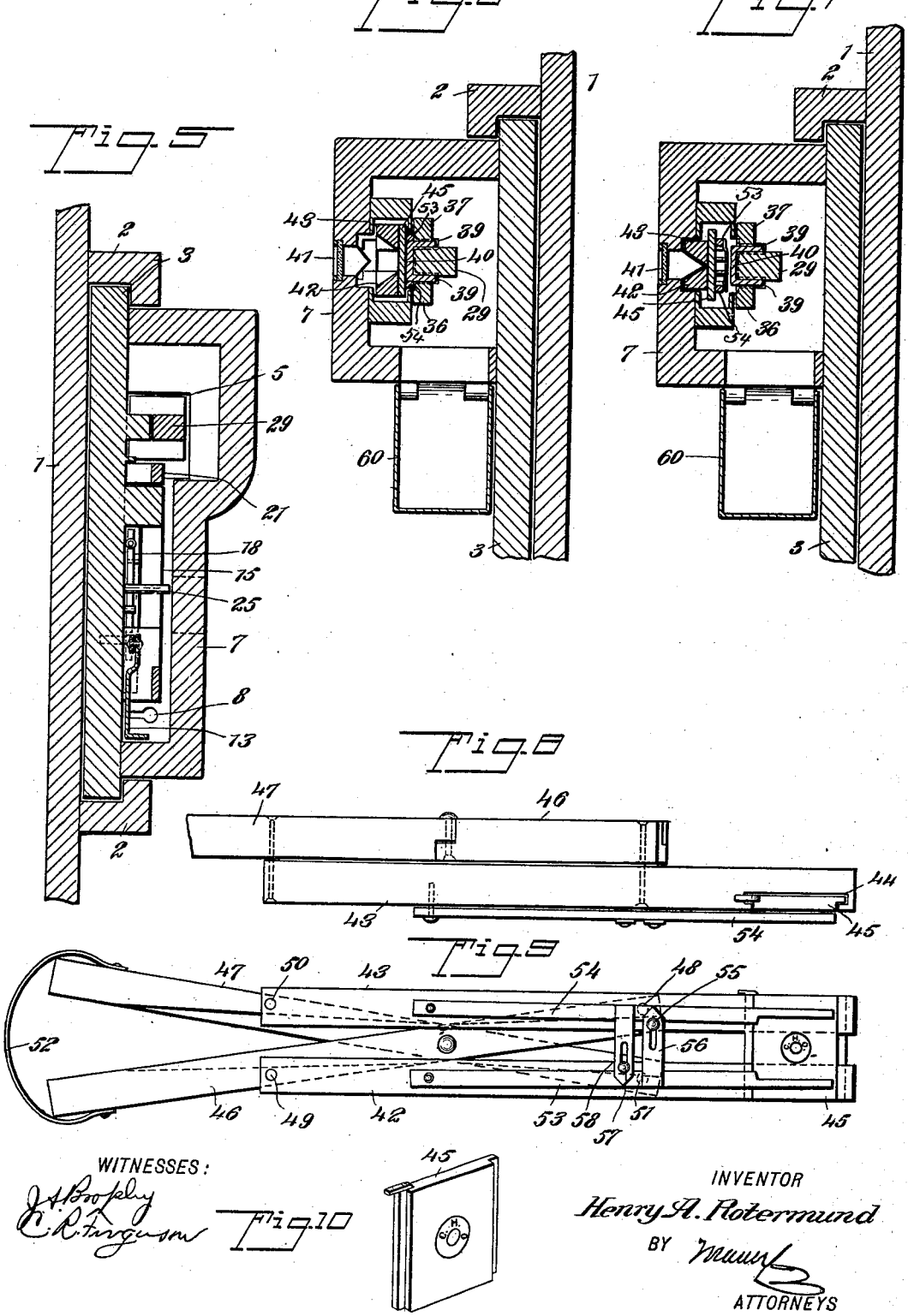
WITNESSES:
INVENTOR
Henry A. Rotermund
BY
ATTORNEYS

UNITED STATES PATENT OFFICE.

HENRY ADOLPH ROTERMUND, OF MONTAGUE, CALIFORNIA.

SEAL-LOCK.

SPECIFICATION forming part of Letters Patent No. 687,069, dated November 19, 1901.

Application filed May 1, 1901. Serial No. 58,244. (No model.)

*To all whom it may concern:*

Be it known that I, HENRY ADOLPH ROTERMUND, a citizen of the United States, and a resident of Montague, in the county of Siskiyou and State of California, have invented a new and Improved Automatic Car Lock and Seal, of which the following is a full, clear, and exact description.

This invention relates particularly to improvements in locks and seals for railway-car doors; and the object is to provide a locking and sealing device of simple construction and in which the seal will be impressed or formed on a blank during the operation of closing the car-door and so arranged that upon unlocking and opening the door the seal will fall into a receptacle and be saved for future melting and use, thus resulting in a saving of lead usually thrown away or lost.

I will describe a car lock and seal embodying my invention and then point out the novel features in the appended claims.

Reference is to be had to the accompanying drawings, forming a part of this specification, in which similar characters of reference indicate corresponding parts in all the figures.

Figure 1:
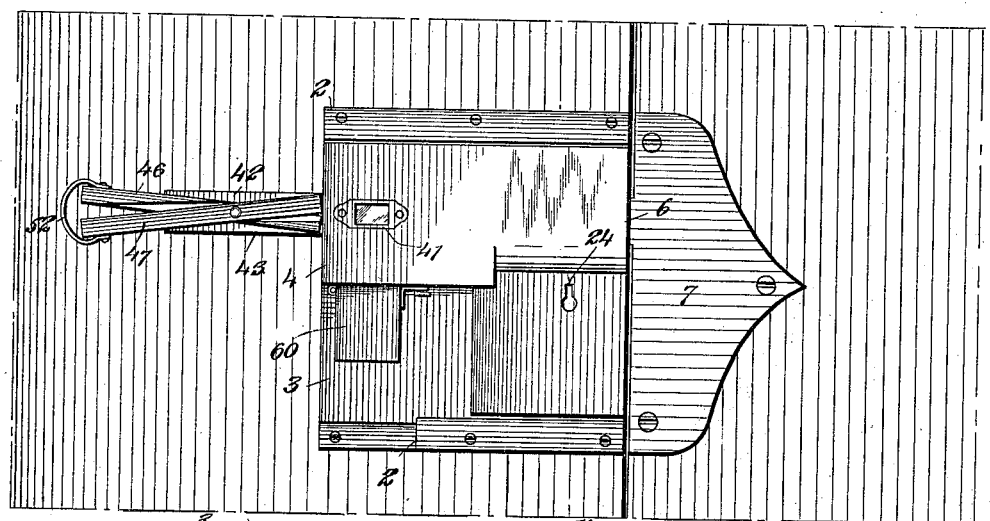
Figure 2:
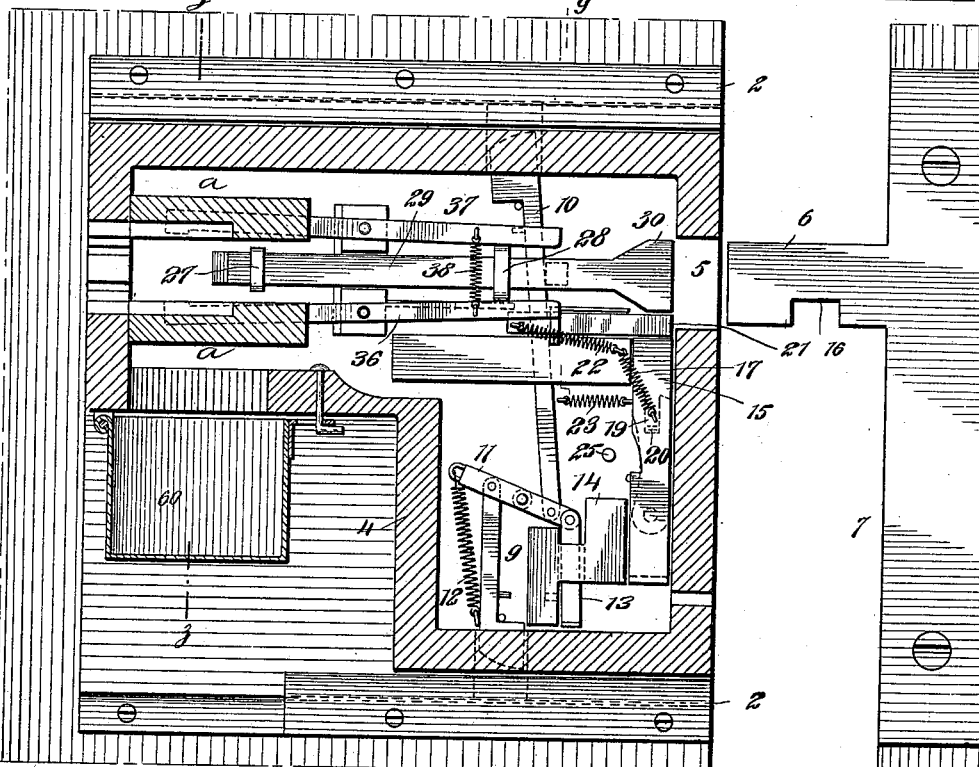

Figure 1 is a front view of a lock and seal embodying my invention. Fig. 2 is a sectional view thereof, showing the parts in unlocking position. Fig. 3 is a similar section, but showing the parts in locking and seal-forming position. Fig. 4 is a section on the line *x x* of Fig. 3. Fig. 5 is a section on the line *y y* of Fig. 2. Fig. 6 is a section on the line *z z* of Fig. 2. Fig. 7 is a similar section to Fig. 6, but showing the seal as released from the setting device. Fig. 8 is a side view of the setting device. Fig. 9 is an inverted plan view thereof, and Fig. 10 is a perspective view of a seal die-plate employed.

Referring to the drawings, 1 designates a plate designed to be bolted or otherwise secured to the side of a car near the door-opening. At its upper and lower sides this plate 1 is provided with side flanges 2, underneath which the edges of the base-plate 3 of the lock-casing are designed to slide. Secured to the locking base-plate 3 is a casing 4, having at the side adjacent the door-opening an opening 5 to receive a locking-latch 6, attached to a plate 7, designed to be secured to the car-door. This plate 7 is of sufficient length to cover the end of the casing 4, and consequently to cover the keyhole 8 when the parts are in locked position. The lock is held in position in the plate 1 by means of slide-bolts 9 and 10, designed to move through openings in the upper and lower walls of the casing 4 and to engage in recesses formed in the side flanges of the plate 1, as clearly indicated in Fig. 3. The slide-bolt 9 is pivoted to one end of a rock-lever 11, while the slide-bolt 10 is pivoted to the other end of said rock-lever. This lever is rocked to move the bolts 9 and 10 into locking position by means of a spring 12, having one end attached to a fixed part of the casing and the other end engaged with the end of the lever 11 with which the bolt 9 engages, and pivoted to the end of the lever 11 with which the bolt 10 connects is a plate 13, mounted to slide through a boxing 14 in the casing. At its lower end this plate 13 has an outwardly-extended portion to be engaged by a key inserted through the keyhole 8. When it is desired to remove the lock from the plate 1, the key is to be inserted through the hole 8 and engaged with the outwardly-turned portion of the plate 13. Then upon a rotation of the key the said plate 13 will be drawn downward, rocking the lever 11, and consequently drawing the bolts 9 and 10 out of engagement with the side flanges of the base-plate 1. The ends of these bolts 9 and 10 are slightly rounded, so as to facilitate the insertion of the lock in the base-plate—that is, by sliding the lock into position the curved ends of said bolts will engage with the flanges, forcing the bolts inward until the depressions in the flanges are reached, when the bolts will be moved outward by the spring 12.

Mounted to slide vertically in the casing is a locking-bolt 15, designed to engage in a notch 16, formed in the lower side of the latch 6. This locking-bolt 15 is moved upward to its locking position by means of a spring 17. The said bolt is recessed on its under side, and pivoted to the plate 3, within said recess, is a holding-dog 18, which at its upper end is provided with an outwardly-opening slot 19 to receive a pin 20 on the bolt 15. In the operation of this part of the device before closing the door the bolt 15 will be held in its lowermost position by means of a slide-bar 21 engaging over the upper end of said bolt and in the line of movement of the latch 6, and at this time the pin 20 will be within the slot 19, as shown in Fig. 2, and the slide-bar 21 will be held in position over the end of the bolt by means of a spring 22. Upon closing the door the latch 6, passing into the opening 5, will strike against the end of the bar 21, sliding it out of connection with the bolt 15, so that when the notch 16 is in line with said bolt the bolt will be moved upward by its spring 17 into said notch. The pin 20 will pass out of the slot 19, and the dog 18 will be swung by means of a spring 23, so that its upper end will engage underneath the pin 20, preventing a downward movement of the bolt 15. In unlocking this bolt out of engagement with the latch 6 a key is to be inserted through the keyhole 24 in the front of the casing. Then upon rotating the key on a pin 25 in the casing the bit of the key will engage with the edge of the dog 18, swinging it inward until its slot 19 is in line with the pin 20. Then upon a further movement of the key its bit will engage a shoulder 26, formed on the edge of the bolt 15, and the said bolt will be slid downward.

Mounted to slide in the casing and through guides 27 and 28 is a seal-pressing bar 29, the enlarged head or end 30 of which is designed to be engaged by the latch 6 when said latch is moved inward, and it is held yieldingly against the end of said latch and returned to normal position, as indicated in Fig. 2, when the latch is removed by means of a spring 31, attached at one end to the seal-pressing bar and at the other end to a lug 32 on the plate 3. Also on this plate 3 is a lug 33, and the inner or under side of the pressing-bar is provided with inclined surfaces 34 and 35, designed to engage, respectively, with the lugs 32 and 33, so that when said bar is moved longitudinally it will be moved outward to press the seal against the forming-die, as will be hereinafter described. Pivoted at opposite sides of the bar 29 are seal clamping or holding levers 36 and 37, which are connected with each other near the headed end of the bar by means of a spring 38. The opposite ends of these clamping-levers are designed to engage with the flanged edges 39 of a lead seal 40 to hold said seal in position on the bar, so that it may be seen through a sight-opening 41 in the front of the casing.

I will now describe a means for inserting a seal-blank in the die for forming the seal. It is to be understood that this device will be held by an agent at a station, or it may be carried by a conductor or other person in charge of the car. This seal and die setting device consists of two parallel holding-bars 42 and 43, each having an incut 44 at one end to receive the die-plate 45, that may be slid therein. The parallel bars 42 and 43 are held yieldingly together by means of levers 46 and 47, each having a shear-like action with relation to each other—that is, these levers are crossed at about their center and pivoted together at this point. At the inner end the lever 46 has a pivotal connection 48 with the bar 43, and it is also pivoted to the outer end of the bar 42 by a pin 49. The lever 47 is pivoted, as at 50, to the outer end of the bar 43, and the inner end of said lever 47 is pivoted, as at 51, to the bar 42. By moving the outer ends of these bars 46 and 47 toward each other, which is conveniently and automatically done by means of a spring 52, connecting said outer ends, the bars 42 and 43 will be moved toward each other.

Mounted on the side of the bars 42 and 43 opposite the levers 46 and 47 are seal-holding fingers 53 and 54. A pin 55 extends from the bar 43 through a slot in a tie-plate 56, extended from a finger 53, and a pin 57 extends from the bar 42 through a slot in a tie-plate 58, attached to a finger 54.

In operation after placing the die-plate 45 in position between the ends of the fingers 53 and 54 and the bars 42 and 43 and then placing the seal-blank over the die portion of the die-plate and clamping it between the ends of the fingers 53 and 54 the device is to be inserted through an opening 59 in the end wall of the lock-casing and between the guide-blocks *a* until the ends of the levers 46 and 47 engage against the outer surface of said end of the casing. Now upon sliding the door to its closed position the latch 6 will engage against the end of the seal-pressing bar 29, forcing said bar longitudinally, and by the means before described the said bar will be moved outward to press the seal-blank with a hammer-like action tightly against the seal, and thus make the impression on the seal-blank. At this time the side flanges of the seal will be engaged against the opposite sides of the pressing-bar, and the ends of the clamps 36 and 37 will be forced against said flanges by the head 30 of the pressing-bar forcing said clamping devices apart, as clearly indicated in Fig. 3. The car-door now being locked and the seal formed and in position, the outer ends of the levers 46 and 47 are to be moved toward each other, so that the ends of the fingers 53 and 54 are released from the seal, the said fingers being moved apart to release the seal by means of the pins 55 and 57 engaging with the inner end walls of the slots in the plates 56 and 58. Now the seal-setting device, with the seal-die, is to be removed. Upon unlocking the door and moving it to its open position the bar 29 will be drawn out of engagement with the seal by the end of the seal striking the guide 27, and then the seal will fall down through an opening in the lower wall of the lock-casing and into a receptacle 60, and accumulated seals in said receptacle may be gathered up when desired and melted over in suitable form, thus resulting in a great economy in lead.

Should a car equipped with one of these locks be turned over to another company at its terminal and the other company is using a different key, the lock can be readily removed in the manner heretofore described and a lock belonging to the new company placed in position.

Having thus described my invention, I claim as new and desire to secure by Letters Patent—

1. A door lock and seal, comprising a casing, a seal-pressing bar, means for temporarily holding a seal-die in the casing, and a seal-blank, means for causing said pressing-bar to move into engagement with the blank to press it against the die and a latch carried by the car-door for engaging the lock, substantially as specified.

2. A door lock and seal, comprising a casing, a latch adapted to be carried on a car-door and to enter an opening in a wall of said casing, a locking-bolt in the casing for engaging with said latch, and means operated by an inward movement of the latch for causing the impression of a seal on a blank, substantially as specified.

3. A door lock and seal, comprising a lock-casing, a plate adapted to be secured to a car, means for removably locking the lock-casing in engagement with said plate, a latch adapted to be carried by a car-door and to enter an opening in a wall of the lock-casing, a pressing-bar adapted to be moved longitudinally and outwardly by an inward movement of the latch, and a seal-die adapted to be held within the lock-casing and against which a seal-blank is pressed by the pressing-bar, substantially as specified.

4. A car lock and seal, comprising a casing, locking mechanism in said casing, a latch carried by a car-door for engaging with said locking mechanism, a die and seal-blank, die and seal-blank holding devices adapted to be inserted through an opening in a wall of the casing, and means operated by an inward movement of the latch for pressing the seal-blank against the die, substantially as specified.

5. A car lock and seal, comprising a casing, locking mechanism in said casing, a latch carried by a car-door and adapted to be engaged by said locking mechanism, a seal-pressing bar movable in the casing, a die and seal-blank setting device adapted to be passed through an opening in a wall of the casing, whereby the pressing-bar during its movement may press the blank against the die, and clamping devices operated by the pressing-bar for engaging and holding the seal on said pressing-bar after removing the die, substantially as specified.

6. A car lock and seal, comprising a casing, a locking mechanism in said casing, a latch carried by a car-door for engaging with the locking mechanism, a seal-pressing bar adapted to be moved longitudinally by an inward movement of the latch, inclined faces engaging with lugs for forcing said bar forward during its longitudinal movement, and means for supporting a die and seal-blank within the casing, whereby the pressing-bar may force the blank against the die to form the seal, substantially as specified.

7. A car lock and seal, a lock-casing, locking mechanism in the casing, a setting device, comprising parallel bars, means for moving said bars toward and from each other, said bars being adapted to receive a die, seal-blank-holding fingers mounted to swing on said bars, and means operated in the lock-casing for pressing the seal-blank against the die, substantially as specified.

8. A car lock and seal, comprising a lock-casing, a plate adapted to be secured to the car-body and having flanges at its upper and lower sides in which the upper and lower edges of the lock-casing may slide, a rock-lever in the casing, bolts pivoted to said rock-lever at opposite sides of the pivotal point, the said bolts being extended in opposite directions and passing through openings in the upper and lower walls of the lock-casing and adapted to engage in recesses in the flanges of the plate, and a slide-plate connected to the rock-lever and adapted to be engaged by a key for moving the bolts out of locking position, substantially as specified.

9. In a car lock and seal, a lock-casing, a latch adapted to be carried by the car-door and having a notch at one side, a locking-bolt mounted to slide in the casing and to engage in said notch, a pin on the inner side of said bolt, a dog pivoted in the casing below or at the inner side of the bolt, the said dog having an outwardly-opening slot to receive said pin, a spring for moving the dog to engage its end with said pin when the bolt is in locking position, and a slide-bar for moving over the end of the locking-bolt to hold said locking-bolt out of locking position, the said slide-bar being moved out of its locking position by an inward movement of the latch, substantially as specified.

10. The combination with a car-lock, of a seal and die setting and holding devices, comprising parallel bars adapted to receive the die at one end, operating-levers crossed and pivoted together and having pivotal connection with the parallel bars at opposite sides of the pivotal connection of the levers, seal-blank-holding fingers pivoted to the parallel bars, and slotted plates extended from said fingers, the slots receiving pins extended from the parallel bars opposite to the fingers with which the plates are connected, substantially as specified.

In testimony whereof I have signed my name to this specification in the presence of two subscribing witnesses.

HENRY ADOLPH ROTERMUND.

Witnesses:
P. E. VAN SCOY,
ED. C. EUSTACE.